Nov. 26, 1968     I. MERLIS     3,412,671

RENDERING APPARATUS

Filed June 13, 1966     4 Sheets-Sheet 3

INVENTOR
IRA MERLIS, DECEASED,
ADMINISTERED BY
MORRIS C. SOLOMON, EXECUTOR.

BY Mason, Porter, Diller & Brown

ATTORNEYS

United States Patent Office

3,412,671
Patented Nov. 26, 1968

3,412,671
RENDERING APPARATUS
Ira Merlis, deceased, late of Whitemarsh, Pa., by Morris C. Solomon, executor, Melrose Park, Pa., assignor to Acme Process Equipment Company, Oreland, Pa., a corporation of Pennsylvania
Filed June 13, 1966, Ser. No. 557,315
11 Claims. (Cl. 99—234)

ABSTRACT OF THE DISCLOSURE

This disclosure is directed to apparatus for the continuous dry-rendering of organic materials and more specifically to apparatus for continuously dry-rendering organic materials comprising offal and the like. The organic materials to be rendered in the apparatus include solid oil-containing materials comprising, for example, animal bone, meat, fat, fish, oil-bearing vegetable materials, butcher scraps, etc. The apparatus comprises a disintegrator for reducing the organic materials to a required particle size, a high-speed film-forming combined evaporator-cooker for rendering the organic material and removing volatiles, a separator for the solids and liquids discharged from the evaparator-cooker, and means associated with the separator for conducting the liquid portion of the rendered material to a moisture-responsive valve with the latter valve having means for recycling any liquid having an excess of 0.5% by weight of water back to the feed of the evaporator-cooker and the substantially dehydrated liquid to storage.

---

This application includes subject matter which is common to and disclosed in applicant's copending now-abandoned application Ser. No. 340,770, filed Jan. 28, 1964, which is in turn a division of applicant's application Ser. No. 218,748, filed Aug. 22, 1962, and now Patent No. 3,282,972.

Heretofore, in rendering oils and fats from solid-containing organic materials including animal carcasses and the like, the solids were crushed to the desired particle size and then fed into a rendering vessel in a batch-wise manner. Each batch was then treated individually until the rendering process was completed which generally required several hours. Subsequently, the rendered materials were discharged and carried to a separator wherein the oil was removed from the solids and in some instances, if desired, the solids were further treated by utilizing solvents to extract any residual oil.

More recently, the batch-wise process and the apparatus used therefor have been replaced by a continuous process wherein the organic materials are rendered in one or more cookers which comprise rotating shafts so as to continuously move the material through the cooker as rendering takes place. As a further modification, it has been proposed to extract the oily fluids from the materials by subjecting them to pressure with live steam or hot water while the cooking takes place. Obviously, however, this approach has not proven satisfactory in that the use of steam results in a considerable amount of condensation over a period of time, e.g., approximately 6–10 hours, forming a large amount of water in addition to the oils and solids. Moreover, the wet process obviously requires an additional step of removing the water to obtain a substantially dry product.

Accordingly, to avoid these problems and to provide a more efficient and rapid method of continuously dry-rendering organic materials, the apparatus in accordance with this invention comprises a dry-rendering system wherein the mixture of the meat scraps, animal tissue and the like is rendered in the presence of effective amounts of oily fluids or tallow. Preferably, the oily fluids are obtained from a previously rendered similar organic material which is recycled in a continuous manner with the meat scraps passing through the system. In this manner, it is possible not only to reduce the overall production costs but also to upgrade the quality of the products. In other words, by having the oily fluids, e.g., tallow, from a previously rendered organic material present in the rendering apparatus during the cooking stages, the medium for transferring heat is substantially improved to a point where the contact time of the materials is reduced, thereby upgrading the quality of the products and decreasing the cost of production.

The apparatus used for the improved process comprises a combination of a disintegrator, a high-speed film-forming combined evaporator-cooker for rendering the organic material and for removing the volatile constituents, a separator for removing the solids from the liquids and a moisture-responsive valve which is actuated automatically to recycle any of the fluids containing in excess of about 0.5% by weight of water. The unique combination of the apparatus in accordance with this invention thus provides a means of dry-rendering organic materials including offal in a more efficient manner without sacrificing the quality of the products.

Accordingly, it is an object of this invention to provide an apparatus for continuously dry-rendering organic materials including, for example, offal, meat scraps, animal tissue and the like to provide tallow which conforms to commercial requirements.

It is another object of this invention to provide the apparatus for dry-rendering organic materials in a continuous manner as distinguished from the wet and batch processes wherein the cost of producing the products is substantially reduced by minimizing the process time while at the same time upgrading the products.

It is still another object of this invention to provide an apparatus capable of yielding a high grade of tallow which contains substantially no moisture, no insolubles or unsaponifiable components.

It is still a further object of this invention to provide an apparatus for dry-rendering organic materials which comprises a combined evaporator-cooker characterized as having maximum heating surfaces for rapid transfer of heat particularly under reduced pressure.

It is still a further object of this invention to provide an apparatus comprising a plurality of high-speed film-forming evaporator-cookers with stationary jacketed cylinders arranged in series and characterized as having an internl removable-type conveying-mixing paddle which rotates at speeds sufficient to produce a centrifugal force capable of projecting the organic materials against the heated surfaces.

These and other objects of the invention will become apparent from a further and more detailed description of the invention to follow.

In general, the apparatus utilized for the continuous process comprises (1) a disintegrator or hammermill primarily used to reduce the organic materials including the offal to the required particle size, (2) a dryer-feed mixing tank having agitating or disintegrating blades for mixing the oily liquids with the disintegrated particles of organic materials, (3) a plurality of combined evaporator-cookers arranged in series for rendering the organic material and to remove any of the volatile constituents therefrom, (4) a separator for removing the solids from the liquid portion of the mixture exiting from the evaporator-cookers and (5) a moisture-sensing controlled value for automatically recycling the undehydrated oily liquids, if any, to the feed of the evaporator-cookers.

The accompanying drawings illustrate the apparatus used in performing the continuous process in accordance with this invention.

Referring now more specifically to the drawings.

Figure 1:
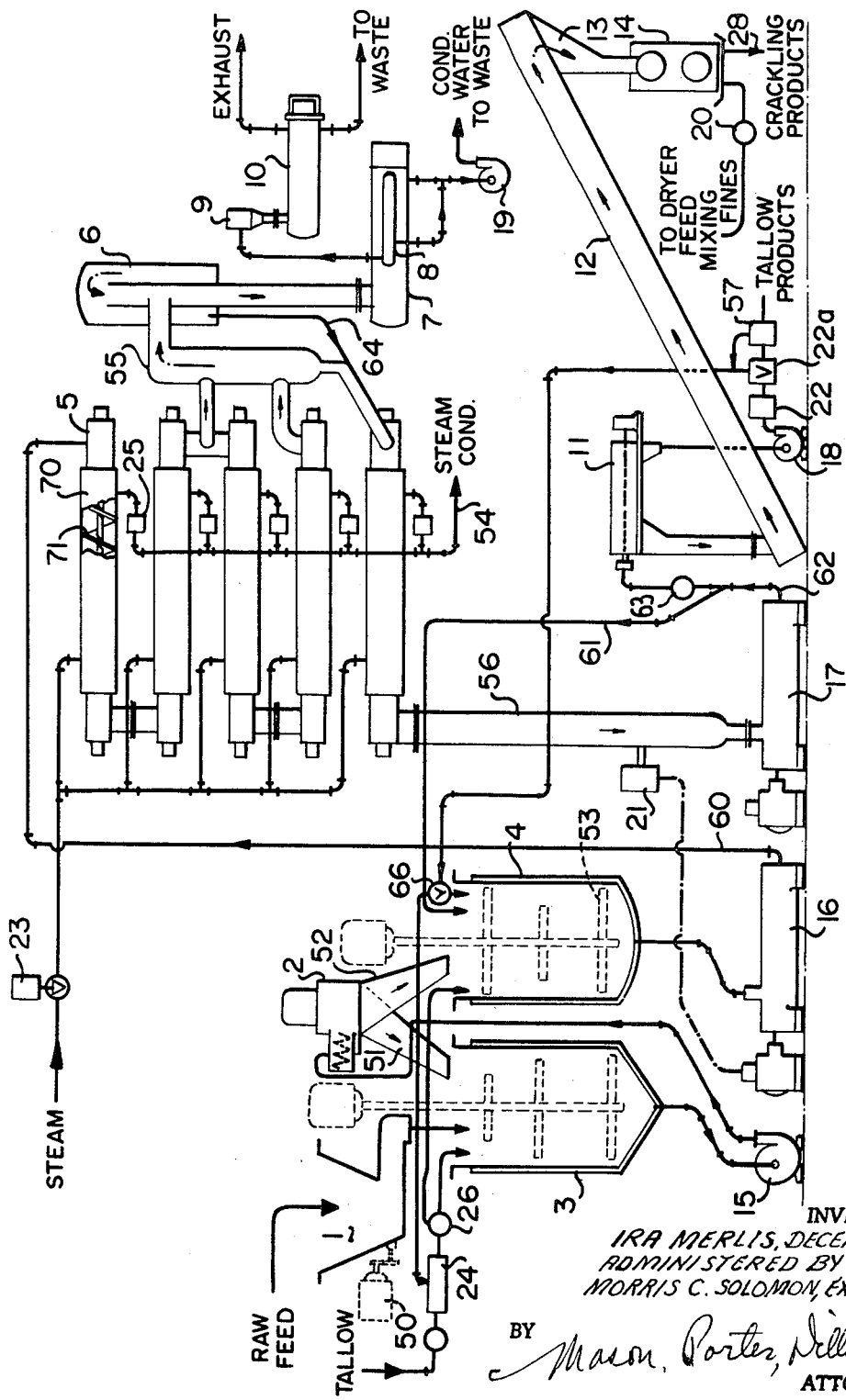
FIGURE 1 is a schematic flow diagram illustrating the process in accordance with the apparatus of this invention.
Figure 2:
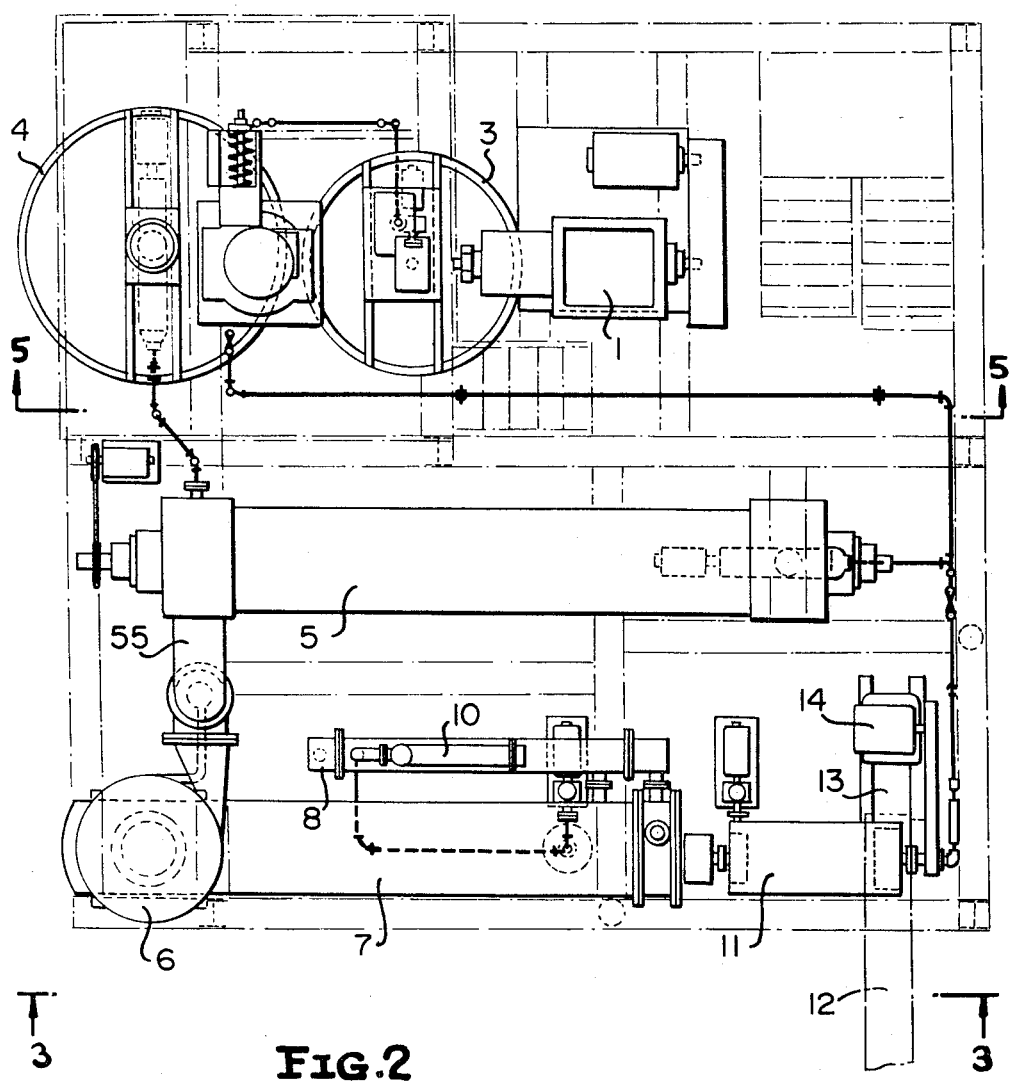
FIGURE 2 is a plan view of the apparatus shown in FIGURE 3.
Figure 4:
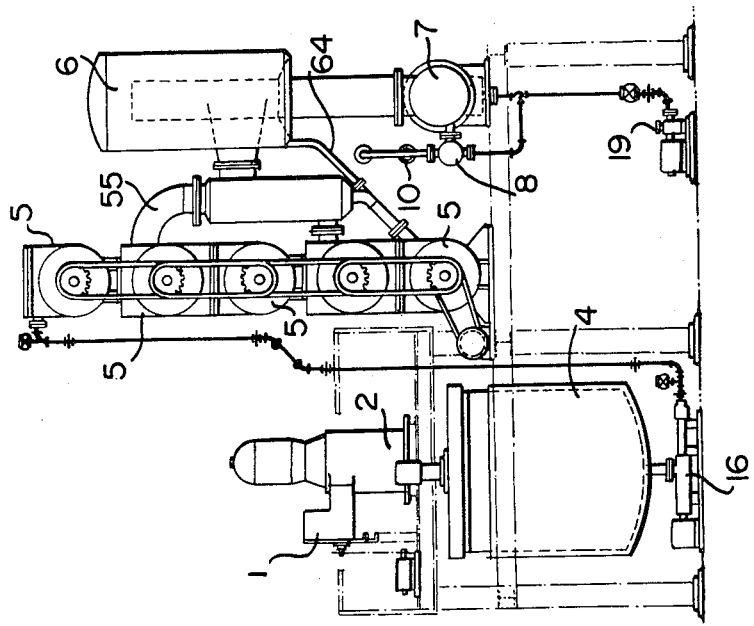
FIGURE 4 is an end elevation view in the direction of 4—4 of FIGURE 3.
Figure 3:
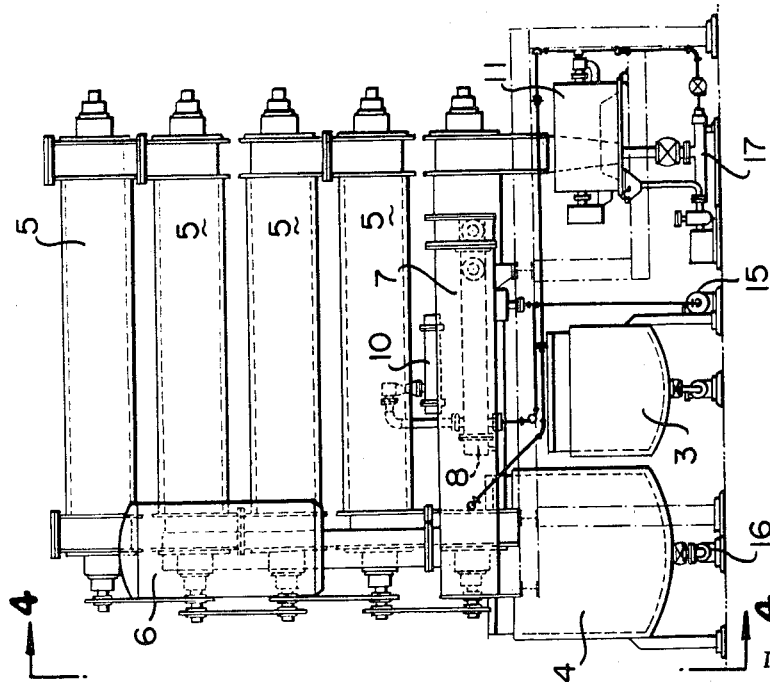
FIGURE 3 is a front elevation view in the direction of 3—3 of FIGURE 2.
Figure 5:
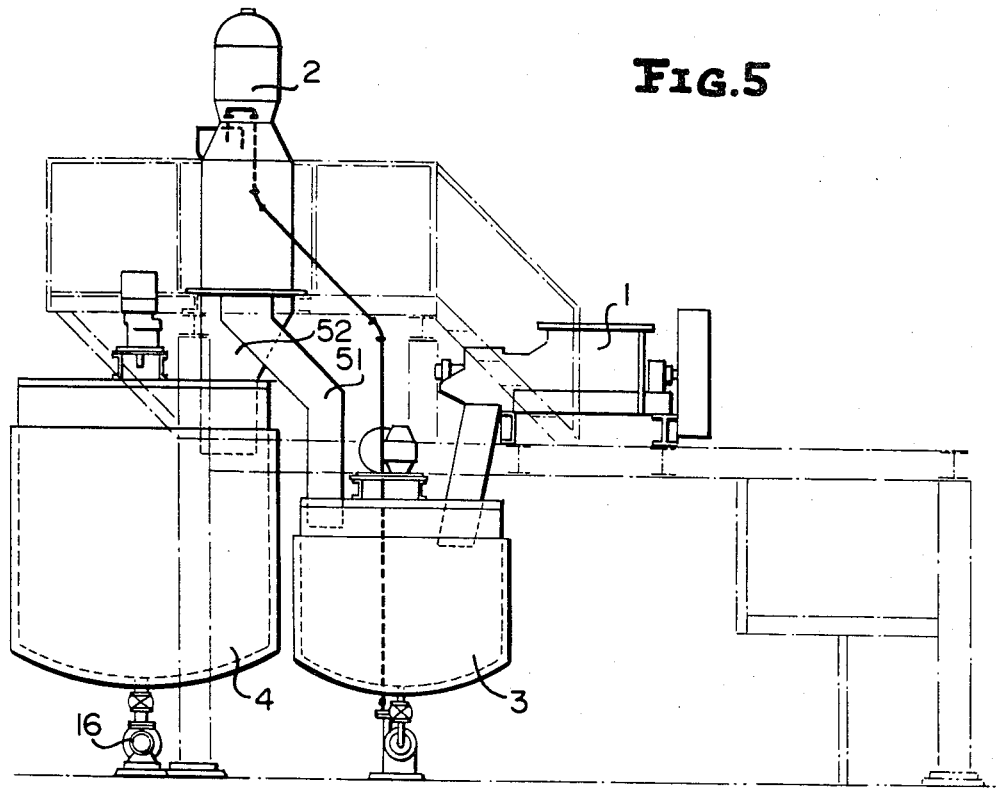
FIGURE 5 is a large vertical section view on 5—5 of FIGURE 2.

More specifically, as shown in FIGURE 1, the process comprises the reduction of the organic materials to small particle sizes which are subsequently mixed with effective amounts of an oily material, e.g., tallow, preferably obtained from a previously rendered similar organic material. The mixture of the solids and oily liquids is then flash-heated or cooked instantaneously in a combined evaporator-cooker at temperatures ranging from about 200° to 212° F. If preferred, however, the cooking or flash-heating of the mixture may be carried out at a temperature of about 200° F. under reduced atmospheric pressures or under a vacuum of approximately 23 inches of mercury. During the rapid cooking of the oily mixture, water and other volatile constituents, e.g., gases, are removed by the evaporator, leaving a substantially dehydrated oily liquid and the cooked solids. These materials are subsequently separated by conventional means, the solids of which are used for cattle feed or fertilizers while the liquid comprising tallow is used for many purposes in the chemical industries.

Subsequent to the separation of the liquids from the solids, a minor portion of the oily liquids may be continuously recycled to the reduced particles of solids which are to be fed into the combined evaporator-cooker. However, if during any period of the process the oily liquids exiting from the separator contain an excess of about 0.5% by weight of water, this portion is considered wet and is automatically recycled through the system. For the most part, however, the apparatus of this invention provides a means of obtaining good yields of substantially dehydrated oily liquids, i.e., tallow, containing less than 0.5% by weight of water which means that very little, if any, of the oily liquids need be recycled.

More specifically, as shown in FIGURES 2–5, the raw organic material comprising the offal is fed into a prebreaker or hog 1 operated by motor 50 which breaks and carries the material to a disintegrator-feed mixing tank 3. Here, the partially broken particles, if desired, may be mixed with effective amounts of oily fluid, e.g., tallow, preferably fluids obtained from previously rendered organic material from storage tank 57. The amount of fluids added to the tank is controlled by the flow meter 24 and the valve 26. The mixture of organic material and oily fluids is pased by means of a transfer pump 15 from the bottom of the tank 3 to the inlet of the disintegrator or hammermill 2. The hammermill comprises primary and secondary discharges which allow the larger particles to be recycled back into the disintegrator-feed mixing tank 3 by means of the secondary discharge 51 while the smaller or reduced particles pass through the primary discharge 52 into the top of the dryer-feed mixing tank 4. The hammermills are available commercially and are known as Rietz disintegrators which comprise a screw conveyor and a plurality of hammers which disintegrate the organic solids. The mixing tank 4 comprises a plurality of rotary disintegrator-agitator blades 53 which keep the mixture of solids and liquids in a fluid state as they are carried from the mixing tank 4 to the top of a series of combined evaporator-cookers 5 by means of a screw-type feed pump 16.

The combined veaporator-cookers 5 are heated by steam which is regulated by a pressure valve 23. The steam passes through the jacketed evaporator-cookers countercurrent to the bow of the mixture of oily fluids and solids and exists near the end of the jackets through steam traps 25 and is carried to a steam condenser by means of pipes 54. Simultaneously with the flow of steam through the jackets of the evaporator-cookers, the mixture of oily solids passes to the top of the cookers and flows countercurrent to the steam in the jackets. Here, in the evaporator-cookers the volatile gases and water vapor are removed by the evaporators and carried from the system by means of a manifold 55 to a vapor entrainment separator 6. Thus, in the separator any entrained fluids removed from the evaporator-cookers are separated and returned to the main stream of the oily mixture via line 64. The substantially dehydrated mixture of solids and liquids is carried to the discharged chamber by means of the discharge pump 17.

The dehydrated mixture of solids and liquids exiting from the series of combined evaporator-cookers is subsequently carried to a liquid-solid separator 11, e.g., a centrifuge, wherein the solids are removed from the dehydrated liquids and carried by means of a conveyor 12 to a hopper 13 and expeller 14. Here, the solids which are known as "cracklings" enter the expeller 14 and exit at 28 as the solid product. The expeller also comprises means of carrying any fine particles of solid material by means of a gear pump 20 back to the mixing tank 4.

The substantially dehydrated oily liquids exiting from the separator 11 pass to a moisture-sensing device 22 which automatically operates the bypass valve 22a located upstream from the main liquid storage tank 57. Here, a small portion of the main stream passes through the moisture-sensing device 22 wherein the amount of water is detected and if the water content exceeds approximately 0.5% by weight, the main stream of the oily liquids is recycled to the feed of mixing tanks 3 or 4.

Figure 6:
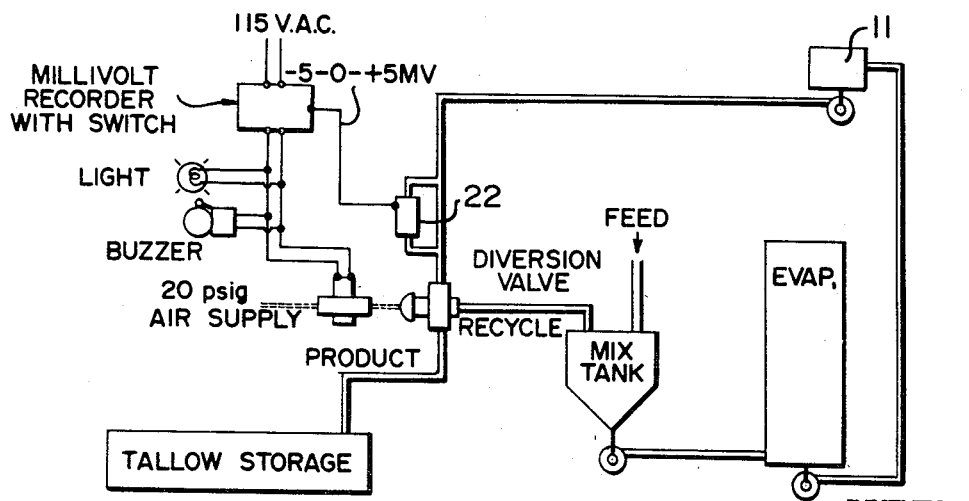
FIGURE 6 is a flow diagram showing the moisture control device upstream of the moisture control bypass valve.

More specifically, as shown in FIGURE 6, the flow diagram illustrates a moisture-control bypass or diversion valve 22a upstream of the storage tank 57 and mixing tank 4. As the oily liquids pass from the separator 11, a portion of the fluid is diverted through the moisture-sensing device 22, i.e., a chromograph, which in turn actuates a switch causing the valve to operate and recycle the undehydrated liquids to the feed of mixing tanks 3 or 4.

If, on the other hand, the apparatus is operating in the usual manner without any difficulties, the oily liquids exiting from the separator are substantially dehydrated or in other words contain less than approximately 0.5% by weight of water and, accordingly, pass directly to the storage tank. In addition to controlling the diversion valve, the moisture control device 22 comprises, in combination, a millivolt recorder, a switch, a light and a buzzer which forewarn the operator who can take the necessary steps needed to place the apparatus in proper working order. Under normal operating conditions the tallow produced by the apparatus of this invention meets the commercial MIU requirements, i.e., moisture, insolubles and unsaponifiables, and passes to the storage tank 57. It is obvious, however, that if any hydrated oily liquids are obtained from the evaporator-cookers, they may be recycled either to the disintegrator-feed mixing tank 3 or the dryer feed mixing tank 4. It is important only that ultimately the wet liquids be recycled to the evaporator-cookers where substantially all of the water can be removed. As a practical matter, under normal operating conditions the liquids exiting from the evaporator-cookers contain less than 0.5% by weight of water and, therefore, very little, if any, of the liquid is required to be recycled through the cookers.

As indicated above, the mixture of solids and oily liquids enters the combined evaporator-cookers and flows in countercurrent to the flow of the steam in the jackets. The moisture and the volatile gases are carried from the evaporator-cookers through the manifold 55 to a separator 6, thus providing a continuous system whereby any entrained oily liquids may be returned to the lowermost evaporator-cooker through line 64 while simultaneously passing the volatile constituents to waste. As noted, the volatile constituents include water vapor and gases normally released during a rendering operation which are carried to the primary condenser 7. The primary condenser 7 comprises a vent cooler 8 and a condensate pump 19 which carries the condensed water to waste. The primary condenser 7 operates in combination with a two-stage jet-air ejector 9 and an after-condenser 10 which provides means for venting the volatiles and allows the remaining to pass to waste. If desired, the ejector 9 may be replaced with a mechanical pump which removes the air containing obnoxious gases which are piped to a furnace (not shown) and burned, thus eliminating the offensive odor normally encountered in rendering processes.

High yields of tallow may be obtained, for example, by rendering organic materials comprising offal in the apparatus in accordance with this invention. The efficiency of the apparatus is due to the component parts and their related functions as a complete unit. More specifically, the combined evaporator-cookers 5, for example, comprise a plurality of one or more stationary cylinders containing steam jackets 70 with internal removable-type conveying and mixing paddles 71 which rotate at high speeds sufficient to produce centrifugal forces which project the mixture of organic material and oily fluids against the heated surfaces of the cylinder. The projection of the oily mixture against the heated surfaces provides a means of instantaneously flash-heating the materials, thus minimizing the operating time normally required to render the mixture. Consequently, by utilizing a plurality of these combined condenser-cookers in accordance with this invention, it is possible to obtain good yields of tallow at comparatively low costs with minimum process time.

In addition, it has been found that improved heat transfer can be obtained by utilizing in combination with the reduced particles of offal a substantial amount of previously prepared oily fluid which, together as a mixture in the evaporator-cookers, has improved fluidity, thus enabling the solids to be rendered more effectively and carried through the system with a minimum of difficulty. The amount of oily liquids, i.e., tallow, which may pass from the storage tank 57 to the flow meter 24 via valve 66 in line 65 and on through either tank 3 or 4 will vary depending upon the type of organic solvents being rendered, the cooking temperatures, and the operating conditions in general. However, for practical purposes, it has been found that the oily liquids are to be mixed with the disintegrated solid particles of offal in effective amounts such that the stream exiting from the evaporator-cookers 5 into the separator 41 comprises at least two parts by weight of the oily liquid, i.e., tallow, for approximately each part by weight of solids. In other words, it is preferred to have the stream exiting from the evaporator-cookers comprise a mixture wherein the ratio of the components is approximately 3 to 8 parts by weight or more of the oily liquid for each part by weight of solids.

The amount of the mixture of liquids and solids exiting from the combined evaporator-cookers is indicated by the level controller 21 which, in turn, controls the amount of solid-liquid mixture exiting from tank 4 to be fed into the top of the evaporator-cookers 5. In other words, the amount of oily-solid mixture which enters the top of the evaporator-cookers is controlled by the rate and speed at which the dehydrated solid-liquid mixture exits the combined evaporator-cookers via the discharge chamber 56 and the discharge screw pump 17 located upstream of the separator 11. Thus, it is possible to increase or decrease the flow of the oily mixture through the evaporator-cookers by means of the level controller 21 which indicates the rate of flow of the dehydrated mixture exiting from the cookers and, in turn, controls the amount of feed being carried to the top of the cookers by means of the screw-type feed pump 16.

The circulating dryer feed pump 16 with remote speed control and discharge pump 17 are provided with means of recycling the oily mixture to the mixing tank 4 via recycling line 61 and then back to the top of the cookers 5 via line 60; subsequently exiting through discharge chamber 56 and pump 17 to line 62 through valve 63 to the separator 11. Thus, it is possible to recycle the fluid mixture exiting from the discharge chamber to the mixing tank 4 if the feed to the separator 11 is greater than that which can be presently handled or if fluid is needed to form a mixture with the solids in the mixing tank 4. With the recycling means and the liquid control valve 21, it is thus possible to regulate the flow of the oily mixture through the system so that optimum operating conditions can be maintained.

While this invention has been described with respect to a specific number of embodiments, it is obvious that there are other variations and modifications which can be resorted to without departing from the spirit of the invention, as particularly pointed out in the appended claims.

What is claimed is:

1. Apparatus for the continuous dry-rendering of organic material which comprises in combination (1) a disintegrator, (2) a high-speed combined evaporator-cooker means which includes means for forming films on the interior surfaces of said cooker means for rendering said organic material and removing volatiles, (3) a separator for the solids and liquids discharged from said evaporator-cooker, and (4) a moisture-responsive valve; said separator having means for conducting the liquid portion of the rendered material to the moisture-responsive valve; said separator having means for conducting the liquid portion of the rendered material to the moisture-responsive valve and said valve having means for recycling any liquids having in excess of 0.5% by weight of water back to the feed of the evaporator-cooker and the substantially dehydrated liquid to storage.

2. The apparatus of claim 1 further characterized in that the evaporator-cooker comprises a plurality of evaporator-cookers operating in series.

3. The apparatus of claim 2 further characterized in that the disintegrator has means for feeding the disintegrated material to the evaporator-cooker; said cooker having longitudinal rotary blades which drive the organic material against the heated walls thereof.

4. The apparatus of claim 2 further characterized in that the evaporator-cookers are steam-jacketed with means for rendering and withdrawing volatiles under reduced pressures.

5. The apparatus as defined in claim 2 including means for removing volatile gases and water vapor from the evaporator-cookers, and means for returning entrained fluids removed from said evaporator-cookers by said removing means upstream of said separator.

6. The apparatus of claim 1 further characterized in that the evaporator-cooker comprises means for rendering and removing volatiles under reduced pressures.

7. The apparatus of claim 6 further characterized in that the evaporator-cooker comprises a central shaft with spirally arranged conveying blades for driving the organic material against the walls of the cooker.

8. The apparatus of claim 1 further characterized in that the separator is a centrifuge.

9. The apparatus as defined in claim 1 including a pair of tanks associated with said disintegrator, means for recycling the material composed of larger particles through one of said tanks and delivering material composed of smaller particles to the other of said tanks, and means for delivering the material from said other tank to said evaporator-cooker means.

10. The apparatus as defined in claim 1 including a pair of tanks associated with said disintegrator, means for recycling material composed of larger particles through one of said tanks and delivering material composed of smaller particles to the other of said tanks, means for delivering the material from said other tank to said evaporator-cooker means, and said recycling means being effective for delivering the liquid having in excess of 0.5% by weight of water back to at least one of said tanks.

11. The apparatus as defined in claim 1 including a tank for oily fluid, and means for controllably delivering the oily fluid from said tank to said disintegrator.

References Cited

UNITED STATES PATENTS

| | | | |
|---|---|---|---|
| 1,789,751 | 1/1931 | Hiller | 240—412.6 |
| 1,821,639 | 9/1931 | Hiller | 99—235 X |
| 1,862,945 | 6/1932 | Schlotterhose | 99—234 X |
| 2,086,072 | 7/1937 | Fauth et al. | 99—235 X |
| 2,112,784 | 3/1938 | McNitt | 99—234 X |
| 2,528,476 | 10/1950 | Roos et al. | 99—246 X |
| 2,650,343 | 8/1953 | Thompson | 23—280 X |
| 2,872,935 | 2/1959 | Kenney | 137—172 |

FOREIGN PATENTS

| | | |
|---|---|---|
| 25,660 | A.D. 1898 | Great Britain. |
| 626,694 | 7/1949 | Great Britain. |
| 917,638 | 2/1963 | Great Britain. |
| 728,592 | 11/1942 | Germany. |

WALTER A. SCHEEL, *Primary Examiner.*